United States Patent
Mai et al.

(10) Patent No.: US 6,814,189 B2
(45) Date of Patent: Nov. 9, 2004

(54) ADJUSTING DEVICE FOR A CABLE

(75) Inventors: Andreas Mai, Wuppertal (DE); Lother Brückner, Leonberg (DE)

(73) Assignee: Edscha AG, Remscheid (DE)

( * ) Notice: Subject to any disclaimer, the term of this patent is extended or adjusted under 35 U.S.C. 154(b) by 190 days.

(21) Appl. No.: 10/220,383

(22) PCT Filed: Mar. 2, 2001

(86) PCT No.: PCT/DE01/00804
§ 371 (c)(1),
(2), (4) Date: Nov. 5, 2002

(87) PCT Pub. No.: WO01/64490
PCT Pub. Date: Sep. 7, 2001

(65) Prior Publication Data
US 2003/0146058 A1 Aug. 7, 2003

(30) Foreign Application Priority Data
Mar. 3, 2001 (DE) .......................... 100 10 641

(51) Int. Cl.[7] .............................. F16D 65/56
(52) U.S. Cl. ............... 188/2 D; 188/196 F; 188/196 V; 74/501 R
(58) Field of Search ............... 188/2 D, 196 F, 188/196 V, 196 B, 196 BA, 196 D, 79.59; 267/272; 74/501 R, 509

(56) References Cited
U.S. PATENT DOCUMENTS 4,113,070 A * 9/1978 Paginton ................. 188/196 F
5,910,194 A * 6/1999 Cho ........................ 74/500.5
6,263,756 B1 * 7/2001 Gabas Cebollero et al. ........................ 74/502.4

FOREIGN PATENT DOCUMENTS

| DE | 4142290 | 7/1992 |
|---|---|---|
| EP | 0792781 | 9/1997 |
| EP | 0914996 | 5/1999 |
| EP | 0936112 | 8/1999 |
| WO | 9857832 | 12/1998 |

* cited by examiner

Primary Examiner—Douglas C. Butler
Assistant Examiner—Bradley King
(74) Attorney, Agent, or Firm—Davidson, Davidson & Kappel, LLC

(57) ABSTRACT

An adjusting device for a cable of a hand-brake. When the hand-brake is disengaged, a tractive element configured as a threaded spindle that can be attached to the cable can be tightened on a spindle nut that surrounds the threaded spindle in relation to a housing by means of the pre-tensioning of a spring. The adjusting device permits a simple, continuous adjustment of a cable. The spring is configured as a constant-force spring, which engages the spindle nut and a supply roll that has a rotational axis parallel to the spindle nut and elements are provided for retaining the tractive element in position relative to the housing when the hand-brake is engaged.

11 Claims, 1 Drawing Sheet

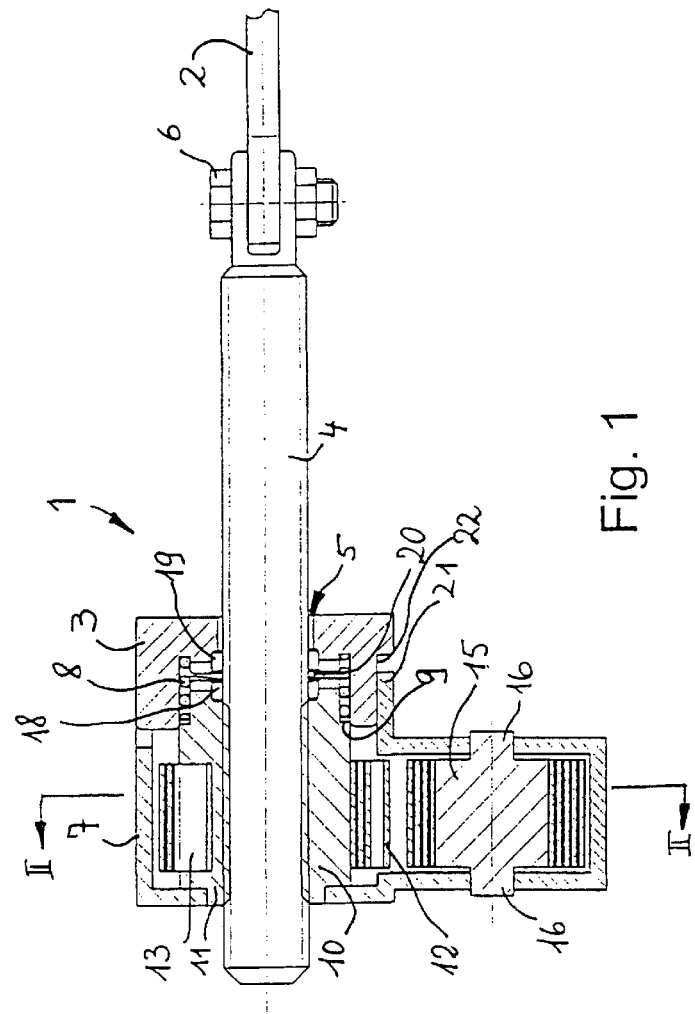
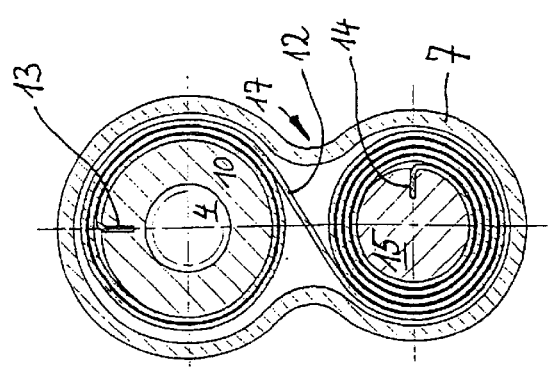

ADJUSTING DEVICE FOR A CABLE

BACKGROUND OF THE INVENTION

The invention relates to an adjusting device for a cable pull of a parking brake, wherein when the parking brake is disengaged, a pulling element capable of being connected to the cable pull and designed as a threaded spindle, can be tightened relative to a housing on account of the prestressing of a spring onto a spindle nut engaging around the threaded spindle.

DE-A41 42 290 describes an adjusting device for a cable pull of a parking brake with a housing, wherein a pulling element is designed, in a first section, with a first external thread and, in a second section, with a second external thread, the two threads having different pitches. Provided on the first section of the pulling element is a first spindle nut, which is designed with an internal thread and, in its outer circumference, has a thread-like groove in which a carry-along element engages, the latter being guided axially in the housing and being prestressed by a first spring counter to the run-out direction of the cable pull. The first spring is supported against a flange section, of which the rear side is subjected to the action of a second spring, which is supported against a second spindle nut, which rides on the second threaded section with a corresponding thread pitch. The second spring acts counter to the first spring. Under the loading of the resultant of the first spring and of the second spring, the pin is displaced in the circumferential groove of the first spindle nut and the latter is rotated, as a result of which the pulling element and the cable pull adjoining the latter are tensioned by displacement of the pulling element. A blocking arrangement is provided for the transportation of the adjusting device. The first spring is designed as a compression spring, of which the stressing force decreases as the spring excursion increases, with the result that it is necessary for the abutment of the first spring to be adjusted via a complicated design with a plurality of thread pitches and a plurality of spindle nuts. For this purpose, it is necessary for a second spring partially to eliminate the restoring force of the first spring counter to the prestressing of the latter. The displacement of the housing is difficult since, as a result of the pulling element tilting, the spindle nuts are blocked and adjustment is no longer possible. Furthermore, the displacement distance of the pulling element is limited on account of the two different circumferential threads, with the result that only comparatively small displacement movements, and thus a small amount of follow-up tensioning of the cable pull, is possible. The adjusting device can only be secured with additional outlay upon actuation of a parking brake.

EP-A-0 914 996 describes a handbrake which is equipped with an automatic adjusting device, wherein the cable pull of a parking brake can be adjusted, via a gear/rack system, by means of two springs arranged one behind the other, of which one is a helical spring and the other is a wrap spring, the known arrangement taking up a large amount of space and, furthermore, requiring high-outlay guidance for the toothed segment. Furthermore, adjusting steps are always provided in the case of rack/gear systems, whereas it would be desirable to have continuous adjustment which correspondingly accommodates the elongation of the brake cable.

WO-A-98 57 832 describes a locking arrangement for the cable-pull adjustment of a brake cable of a parking brake, wherein a toothed-surface pulling element is prestressed on account of the prestressing of a spring counter to the loading of the brake cable and of the brake-actuating elements coupled thereto, it being possible for the toothed surface to be locked in the manner of a catch mechanism by a toothing formation, which is directed toward said surface, of a clamping element. The clamping element has a wedge-shaped head, which is supported against a wedge guide, likewise of wedge-shaped design, of a clamping housing and, on account of guide-pin ends which project laterally from the head and force the same to move along two ramps of the blocking housing, which are likewise of wedge-shaped design, is raised when the clamping element is displaced axially, with the result that the clamping element, at the same time, executes a movement in the direction away from the toothing formation. On account of a locking spring, the clamping element is prestressed into an engagement position for producing the catch mechanism, with the result that, when the parking brake is actuated, via this catch mechanism, the brake cable pull is tensioned. When the parking brake is disengaged, an angular extension of the clamping element, against which the locking spring is supported, strikes against a stop, as a result of which the clamping element, with the locking spring being subjected to stressing, is displaced axially and, on account of the guide, is also disengaged from the pulling element, as a result of which the effect of the catch mechanism is eliminated. When the parking brake is disengaged, the stop is actuated, with the result that release takes place whenever the parking brake is disengaged. Raising the brake-actuating lever of the parking brake results in tensioning of the brake cable, in its position, assumed on account of the position of the pulling element in accordance with the prestressing of the spring, in which it should not sag, for actuating the brake body, in that the locking spring displaces the clamping element, upon removal of the extension of the latter from the stop, in the direction of an effective catch mechanism of the toothing formations again. The known locking arrangement, on account of the coaxial design of the locking spring and of the spring for adjusting the brake cable, is susceptible to slippage of the pull rod. Furthermore, on account of the type of toothing formation, the locking only allows a limited number of adjustments of the catch mechanism, whereas it would be desirable to provide a larger number or to provide step-free latching positions. Furthermore, the toothing formation has to be designed as a sawblade toothing formation, with the result that a definite latching sound can be heard when the two parts are moved relative to one another.

SUMMARY OF THE INVENTION

It is an object of the present invention to provide an adjusting device, which easily allows continuous adjustment of a cable pull.

The present invention provides an adjusting device for a cable pull of a parking brake. The adjusting device includes a cable pull, a housing, a pulling element including a threaded spindle and capable of being connected to the cable pull, a spindle nut engaging around the threaded spindle, a supply reel having an axis of rotation parallel to an axis of the spindle nut, and a scroll spring acting on the spindle nut and on the supply reel. When the parking brake is disengaged, the cable pull is tightened relative to the housing using a prestressing of the scroll spring. When the parking brake is engaged the pulling element is retained relative to the housing.

The adjusting device according to the invention makes it possible for the cable pull to be adjusted continuously by virtue of the pulling element connected to the cable pull being tightened, it being possible for the spindle nut and the threaded spindle, for adjustment of a predetermined distance, on account of a corresponding pitch, to carry out the adjustment within any desirable route, which can preferably be adapted to a conventional aging-induced elongation of the cable pull. It has to be understood that the spindle is assigned, if appropriate, a torque support which, in addition to the attachment to the cable pull, ensures that the spindle is only displaced axially and is not rotated as well. The threaded spindle here passes through the housing without coming into contact with parts of the housing outside the spindle nut, with the result that the adjustment of the cable pull and/or of the threaded spindle is carried out axially exclusively on account of a rotary movement of the spindle nut, by the spring force acting thereon. The means for retaining the pulling element when the parking brake is engaged, or as the parking brake is being engaged, are necessary in order to prevent the cable pull from being relieved of loading by the threaded spindle rotating back as the parking brake is being engaged. It is possible for these means both to effect a force-fitting and/or form-fitting external engagement of the spindle nut and to be realized by a self-locking configuration of the spindle/spindle nut system. At the same time, it is possible to limit the displacement distance of the threaded spindle by an end stop or the like and thus to ensure that the cable pull is always tensioned following a certain tightening distance. The parking brake can be secured in a known manner, e.g. by a catch/toothed segment system.

The spring for acting on the spindle nut is designed as a scroll spring which, by virtue of its tangential introduction of force into the spindle nut, ensures a permanently applied torque and acts on a supply reel. This torque does not have to be large since, as a result of the thread, the force introduced is stepped down. Scroll springs have a flat spring characteristic and a negligible hysteresis, for which reason the torque which acts on the spindle nut is essentially constant over the entire length of the unwound scroll spring. It is advantageously possible here for scroll springs to be easily configured to the effect that they accommodate up to 100 turns, the number of turns over the elongation extent of the cable pull during the service life defining the number of spindle-nut turns which are to be correspondingly provided relative to the threaded-spindle section, and thus also allowing very flat pitches with correspondingly precise adjustment.

The supply reel, on which the scroll spring acts, is designed with a circular or more or less circular cross section, which has winding up on it those windings of the scroll spring which have been unwound from the spindle nut, which likewise preferably has a more or less circular outer circumference. The supply reel itself is accommodated in a rotatable manner, for example by way of shaft stubs mounted in corresponding bores, and can be moved, as far as possible, in a resistance-free manner, with the result that the force introduced is attributable exclusively, or predominantly, to the scroll spring. The diameter of the supply reel here may also be smaller than the diameter of the outer circumference of the spindle nut, and should be sufficiently spaced apart from the housing in order to be able to accommodate, if appropriate, a multiplicity of windings of the scroll spring.

The supply reel and the spindle nut expediently have axes of rotation which are parallel to one another and preferably to the longitudinal axis of the threaded spindle, particularly favorable tangential introduction of force by the scroll spring being ensured when the scroll spring winds up on the circumference of the spindle nut and on the supply reel in opposite directions, that is to say, as seen in cross section, the scroll spring is of S-shaped configuration in the transition region between the two outer contours. This makes it possible for relatively high forces to be transmitted to the spindle nut.

The spindle nut, the supply reel and the scroll spring are preferably arranged in a common housing part, which can be moved relative to the housing, which is arranged in a non-displaceable, if appropriate pivotable, manner on the brake-actuating lever or on a part projecting rigidly therefrom. The movement distance of the housing part is preferably limited here by lateral guides and/or an end stop, with the result that, ultimately, the housing part moves relative to the housing in the manner of an on/off switch, wherein with the housing part displaced, the adjusting device allows tensioning of the cable pull on account of the spindle nut being subjected to the spring action and, with the housing part brought into abutment with the housing, this being excluded.

The housing part is expediently prestressed into the release position relative to the housing by means of a compression spring, for example of a helical spring, with the result that rotation of the spindle nut and thus also of the threaded spindle is permitted whenever the parking brake has not been, or is not being, engaged. If, in contrast, the parking brake is engaged on account of an engaging movement of the brake-actuating lever, the spring is compressed such that the housing part and housing come into contact with one another and the capacity of the spindle nut to move freely is eliminated.

It is possible for the housing to be arranged rigidly on the brake-actuating lever, but it is preferable for the housing to be arranged pivotably on the brake-actuating lever, in order to ensure optimum cable run-out.

It is preferable for at least the housing or the spindle nut to have a friction or brake pad or Hirt serrations, these, when the housing part comes into abutment with the housing, preventing rotation of the spindle nut, as a result of which, when the parking brake is engaged, the brake cable is tensioned without the adjusting device yielding.

A particularly preferred configuration of the adjusting device according to the invention makes it possible to dispense with external means for locking the spindle nut for securing the threaded spindle when the parking brake is engaged, or to provide said means just as a safety measure, in that the forces correspondingly acting on the spindle/spindle nut system are coordinated with the pitch of the same such that, when the parking brake is disengaged, the cable pull can be adjusted on account of the action of the spring, whereas, when the parking brake is engaged, the thread flanks, which are in engagement with one another, are retained in a self-locking manner in relation to one another and spinning of the spindle nut is prevented on account of the self-locking. Force-fitting and/or form-fitting retaining means acting on the outside of the threaded spindle in the engaged state of the parking brake are then no longer necessary for fixing the threaded spindle or may be provided as additional securing means without actually being used on a regular basis. For example, when the parking brake is disengaged, the force acting on the cable pull for the follow-up tensioning of the spring is between 50 and 250 N, preferably approximately 100 N, whereas, when the parking brake is engaged, forces of far more than 1 000 N, expediently more than 2 500 N and preferably 5 000 N and above, are active, these giving rise to self-locking of the thread flanks of the threaded spindle and spindle nut.

Further advantages and features of the invention will become apparent from the following description and from the claims.

BRIEF DESCRIPTION OF THE DRAWINGS

The invention is explained in more detail hereinbelow, by way of a preferred exemplary embodiment of an adjusting device for a cable pull of a parking brake, with reference to the attached drawings.

FIG. 1 shows, in plan view, a longitudinal section through a preferred exemplary embodiment of an adjusting device according to the invention.

FIG. 2 shows a cross section through the adjusting device from FIG. 1 along line II—II.

DETAILED DESCRIPTION

The adjusting device 1 for a cable pull 2 of a parking brake which is shown in FIGS. 1 and 2 comprises a housing 3, which has a threaded spindle 4 passing through it in the region of a corresponding opening 5. The housing 3 is secured on the brake-actuating lever of a parking brake via a rotary articulation (not illustrated), to be precise such that, upon actuation of the brake-actuating lever about a pivot axis around a lever holder, the housing 3 is likewise displaced about the pivot axis, counter to the run-out direction of the cable pull 2, as a result of which the cable pull 2 is tensioned. Fitting the housing 3 in a pivotable manner on the brake-actuating lever ensures that the run-out angle of the cable pull is only changed to a slight extent by the adjusting device even at relatively high tightening angles of the brake-actuating lever. The cable pull 2 is secured on the threaded spindle 4, via an eyelet, by a bolt 6, which passes through both parts, and a nut, which is tightened on said bolt, or some other type of fastening, with the result that the cable pull 2 can rotate about the axis of the bolt 6.

Outside its pivotable articulation on a brake-actuating lever, the adjusting device 1 has a housing part 7 which can be displaced relative to the housing 3 and can be disengaged from, and engaged with, the housing 3 in accordance with an axial displacement movement running parallel to the axis of the threaded spindle 4. The housing 3 and the housing part 7 are secured against falling apart from one another by being interlocked. The housing 3 and the housing part 7 are prestressed in relation to one another in the disengaged state by a compression spring 8, which is designed as a helical spring, one end of the compression spring 8 being supported against the housing 3, while the other end of the compression spring 8 is supported against an circumferential border 9 of a spindle nut 10, of which the end which is directed away from the compression spring 8 is designed as a hollow shaft stub 11 which is mounted in the housing part 7. The spindle nut 10, which is toothed along its internal diameter, meshes with the threaded spindle 4 and defines, with the latter, the conversion of the linear displacement movement of the threaded spindle 4 into a rotary movement of the spindle nut 10.

Wound up on the outer circumference of the spindle nut 10 is a spring 12 which is designed as a scroll spring and has a plurality of windings, the end of the scroll spring 12 being secured in a slit 13 or some other fastening means in the other circumference of the spindle nut 10. The other end of the band of the scroll spring 12 is secured in a slit 14 of a supply reel 15, on the outer circumference of which the scroll spring is wound up a number of times. The supply reel 15 here is accommodated in a rotatable manner in corresponding recesses of the housing part 7 via two axially projecting shaft stubs 16, the distance of the circumference of the supply reel 15 being at least sufficient in order for most of the metal band of the scroll spring 12 to be wound up thereon. The scroll spring 13 ensures that the spindle nut 10 is driven automatically, with the result that the brake cable or the cable pull 2 is always tightened under the prestressing predetermined by the scroll spring 12 and actuates the brake cylinders without play when the brake-actuating lever is engaged.

As can be seen in FIG. 2 in particular, the spindle nut 10 and the supply reel 15 always have opposite directions of rotation, as seen in cross section, because the band of the scroll spring 12 runs out radially from the uppermost wound winding in the form of an S in each case and follows a diagonal in the housing part 7. This makes it possible to design the housing part 7, in the region of the diagonal, with constrictions 17, which allow a particularly compact and low-volume design.

On their mutually facing end sides in the region of the opening 5, that is to say enclosing the threaded spindle 4 radially, the housing 3 and the threaded spindle 10 have mutually facing brake pads 18, 19, between the mutually facing end sides of which there is a narrow gap 20, with the result that, in the state shown in FIG. 1, the brake pads 18, 19 are not in engagement with one another. It can be seen that the axial guidance of the housing part 7 in relation to the housing 3 is formed by a projecting crosspiece 21 of the housing part 7 and a complementary guide path 22 on the housing 3.

The invention functions, then, as follows:

Starting from the position in which the brake-actuating lever is disengaged, as is shown in FIG. 1, the threaded spindle can rotate freely within the housing 3, with the spindle nut 10 being rotated in the process, wherein the force transmitted from the scroll spring 12 to the spindle nut 10, and transmitted in accordance with the transmission ratio from the circumference to the inner toothing formation, transmits prestressing to the cable pull 2, which is attached to the threaded spindle 4. The scroll spring 12 thus defines the prestressing under which the cable pull 2 is retained in the disengaged state, with the result that there is no sagging of the cable pull 2 between the adjusting device and the brake cylinders. The length of the threaded spindle 4 is sufficiently dimensioned for the projection beyond the housing 3 to correspond to the elongation of the cable pull 2 over its service life. As the age-induced elongation of the cable pull 2 progresses, the threaded spindle 4, on account of the prestressing of the scroll spring 12 and of the corresponding rotary movement of the spindle nut 10, is displaced gradually forward, that is to say to the left in the illustration according to FIG. 1, in relation to the housing 3. The displacement distance here depends on the pitch of the threaded spindle 4 and spindle nut 10. A pitch of approximately 10 mm is provided for each turn of the threaded spindle in the present exemplary embodiment, with the result that an average elongation during the service life of 40 mm is accommodated by just four turns of the spindle nut 10, it also being possible, on account of the length of the threaded spindle 4, for up to three times this to be accommodated, the length or the number of windings of the scroll spring being configured correspondingly. Alternatively to this, it is possible to provide a flatter pitch for the toothing formation of the threaded spindle 4 and, with the correspondingly longer scroll spring 12, to provide a shorter distance for each rotation.

If the brake-actuating lever is actuated, the housing 3 is displaced counter to the run-out direction of the cable pull 2, the inertia (or self-locking in the case of a small pitch) of the threaded spindle 4 and spindle nut 10 causing the housing part 7 to be displaced axially, counter to the prestressing of the compression spring 8, in the direction of the housing 3, as a result of which the brake pads 18, 19 engage with one another and rotation of the spindle nut 10, and thus axial displacement of the threaded spindle 4, is prevented. This ensures that the engaged parking brake is not released again by the adjusting device 1 yielding, which would possibly result in a secured vehicle thereby rolling away.

The displacement distance of the brake-actuating lever which is necessary in order to breach the gap 20 between the brake pads 18, 19 is small. It has to be understood that the force of the compression spring 8 is higher than the tensioning transmitted to the cable pull 2 on account of the scroll spring 12.

If the brake-actuating lever is released again, the compression spring 8 forces the housing part 7 out of engagement in relation to the brake pads 18, 19 again such that the spindle nut 10 can be rotated in relation to the housing 3 and/or the housing part 7 again and, on account of the force introduced by the scroll spring 12, the cable pull 2, which sags in a non-tensioned manner when the parking brake is no longer engaged, can be adjusted.

The invention has been described above with reference to an exemplary embodiment in the case of which the axial fixing of the threaded spindle 4, when the parking brake is engaged, is realized by brake pads 18, 19 on end sides of the housing 3 and spindle nut 10. As an alternative to the brake pads 18, 19, which act predominantly on account of the increased frictional force which is necessary, Hirt serrations, in the case of which a form-fitting component provides more reliability, are also possible. It is possible to dispense altogether with these form-fitting and/or force-fitting means for retaining the threaded spindle 4 when the circumferential toothing formation of the threaded spindle 4 and the inner toothing formation of the spindle nut 10 are coordinated with one another such that, when a predetermined minimum force is exceeded in the axial direction of the threaded spindle, they ensure, with self-locking action, locking in relation to one another, with the result that spinning of the spindle nut 10 is prevented. In this state, there is no force introduction on the part of the scroll spring 12, and cable adjustment does not take place. For this purpose, it is possible to select flat thread pitches for the threaded spindle 4 and spindle nut 10, and it is also the case that the materials are to be selected correspondingly and the surfaces are to be produced correspondingly.

What is claimed is:

1. An adjusting device for a cable pull of a parking brake, the adjusting device comprising:
   a cable pull;
   a housing;
   a pulling element including a threaded spindle and capable of being connected to the cable pull;
   a spindle nut engaging around the threaded spindle;
   a supply reel, said supply reel having an axis of rotation parallel to an axis of the spindle nut; and
   a scroll spring acting on the spindle nut and on the supply reel,
   wherein the cable pull is tightened relative to the housing using a prestressing of the scroll spring when the parking brake is disengaged, and wherein the pulling element is retained relative to the housing when the parking brake is engaged.

2. The adjusting device as claimed in claim 1, wherein the supply reel and the spindle nut each have a circular outer circumference, and wherein at least one of the supply reel and of the spindle nut is surrounded by a plurality of windings of the scroll spring.

3. The adjusting device as claimed in claim 1, wherein the supply reel and the spindle nut rotate in opposite directions to one another.

4. The adjusting device as claimed in claim 1, wherein the scroll spring, the spindle nut and the supply reel are arranged in a common housing part, and wherein the housing part is displaceable axially relative to the housing.

5. The adjusting device as claimed in claim 4, wherein at least one of the housing and the spindle nut is provided with brake pads configured to prevent the spindle nut from rotating relative to the housing when the parking brake is engaged.

6. The adjusting device as claimed in claim 4, further comprising a second spring, the second spring prestressing at least one of the housing part and the spindle nut in relation to the housing, such that when the parking brake is engaged, the second spring is compressed and the spindle nut comes into contact with the housing.

7. The adjusting device as claimed in claim 1, wherein the threaded spindle and the spindle nut are configured in a self-locking manner for retaining the pulling element such that, when the parking brake is disengaged, the cable pull is adjusted using the scroll spring and, when the parking brake is engaged, rotation of the spindle nut and threaded spindle in relation to each other is inhibited.

8. The adjusting device as claimed in claim 1, wherein the scroll spring accommodates less than 100 turns.

9. The adjusting device as claimed in claim 1, wherein the threaded spindle has a pitch of 10 millimeters for each turn.

10. A parking brake including a brake-actuating lever and an adjusting device disposed on the brake-actuating lever, said adjusting device comprising:
    a cable pull;
    a housing;
    a pulling element including a threaded spindle and capable of being connected to the cable pull;
    a spindle nut engaging around the threaded spindle;
    a supply reel, said supply reel having an axis of rotation parallel to an axis of the spindle nut; and
    a scroll spring acting on the spindle nut and on the supply reel;
    wherein the cable pull is tightened relative to the housing using the prestressing of the scroll spring when the parking brake is disengaged, and
    wherein the pulling element is retained relative to the housing when the parking brake is engaged.

11. The adjusting device as claimed in claim 10, wherein the housing is connected in a non-displaceable manner to the brake-actuating lever.

* * * * *